(12) United States Patent
Wenger et al.

(10) Patent No.: US 8,648,612 B2
(45) Date of Patent: Feb. 11, 2014

(54) CALIBRATION OF A DISTANCE MEASURING DEVICE

(75) Inventors: Fabian Wenger, Göteborg (SE); Valter Nilsson, Hovås (SE)

(73) Assignee: Rosemount Tank Radar AB, Gothenburg (SE)

( * ) Notice: Subject to any disclaimer, the term of this patent is extended or adjusted under 35 U.S.C. 154(b) by 886 days.

(21) Appl. No.: 12/833,187

(22) Filed: Jul. 9, 2010

(65) Prior Publication Data

US 2012/0010838 A1    Jan. 12, 2012

(51) Int. Cl.
*G06F 19/00*    (2011.01)
(52) U.S. Cl.
USPC .......................................... 324/640; 342/124
(58) Field of Classification Search
None
See application file for complete search history.

(56) References Cited

U.S. PATENT DOCUMENTS

| | | | |
|---|---|---|---|
| 5,651,286 A | 7/1997 | Champion et al. | 73/290 |
| 6,087,978 A | 7/2000 | Lalla et al. | |
| 6,122,602 A * | 9/2000 | Michalski et al. | 702/159 |
| 6,509,864 B1 * | 1/2003 | Mende et al. | 342/118 |
| 2004/0004905 A1 | 1/2004 | Lyon et al. | 367/13 |

FOREIGN PATENT DOCUMENTS

| | | |
|---|---|---|
| EP | 1770409 A1 | 4/2007 |
| GB | 2 472 085 A | 1/2011 |

OTHER PUBLICATIONS

Hjortland, H.A. et. al., "CMOS Impulse Radar" in Proceedings 24th Norchip Conference, 2006, IEEE, p. 75-79.*
International Search Report and Written Opinion for PCT application No. PCT/EP2011/066700, dated Oct. 31, 2012, 9 pages.
"Threshold Samplers for UWB Impulse Radar" Hjortland, et al.; 2007, pp. 1210-1213.
Search Report from PCT Application No. PCT/EP2011/060288, dated Oct. 13, 2011, 3 pgs.
Written Opinion from PCT Application No. PCT/EP2011/060288, dated Oct. 13, 2011, 6 pgs.

* cited by examiner

*Primary Examiner* — Melissa Koval
*Assistant Examiner* — Stephen G Armstrong
(74) *Attorney, Agent, or Firm* — Westman, Champlin & Koehler, P.A.

(57) ABSTRACT

A device for using electromagnetic pulses to determine a distance to a surface includes a pulse generator, a real time sampler and a calibration unit having a signal generator for generating a calibration signal with a predefined frequency. In a calibration mode the real time sampler receives the calibration signal, and an average sample time delay of the sampler is determined based on the sampled calibration signal and the known calibration frequency. In a measurement mode, the real time sampler receives a reflection signal and the distance is determined based on a sampled reflection signal and the average sample time delay. Knowledge of the average delay of the sampler makes it possible to exactly determine the distance (in time and thus space) between two points in the sampled signal.

17 Claims, 4 Drawing Sheets

Unstitched delay line elements

CALIBRATION OF A DISTANCE MEASURING DEVICE

TECHNICAL FIELD

The present invention relates to calibration of a distance measuring device based on real time sampling of electromagnetic pulses emitted towards and reflected by a surface. The invention is specifically related to calibration of a radar level gauge.

TECHNICAL BACKGROUND

A distance measurement device, or ranging device, is based on the principle that an electromagnetic pulse is transmitted towards a surface or an object, and a reflected pulse is received. The distance can then be determined based on the time-of-flight of the pulse to the surface or object and back. This determination can be performed using suitable signal processing. Ideally, the received signal would simply be sampled in order to detect an echo peak. However, as electromagnetic waves propagate with the speed of light, the echo peak will typically have a duration in the order of only a few nanoseconds. Conventional samplers are not fast enough to capture such a fast pulse with sufficient resolution to detect a distance with high accuracy.

Solutions to this problem are known, for example in the level gauging field. In level gauges employing electromagnetic pulses (here referred to as radar level gauges, RLG, even though the frequencies employed are not necessarily in the conventional radar range) the gauge transmits a pulse train comprising nanosecond pulses with a repetition frequency in the Megahertz range. The reflected pulse train is mixed it with the transmitted signal, in order to provide a time expanded pulse response. While providing a satisfactory result, this process requires a complex and relatively expensive design. Efforts have therefore been made to provide real time sampling on a time scale short enough to allow sampling of one single pulse or as few pulses as possible to map the range of the signal (e.g. 32 pulses for 5-bit resolution).

As one alternative, it has been proposed to use a radar module integrated on one silicon chip. Such a module can allow sampling in real time of a pulse with a time duration in the order of ns or less, with a known time relationship between transmitted signal and received signal.

According to one operating principle for such a single chip radar module, a received pulse is compared to a threshold level and sampled by a large number (e.g. 128) successive samplers beginning at a given point in time (strobed sampling) and ending at another point in time, such that the sampling covers a time window typically longer than the pulse itself. By repeating the sampling several times, while gradually increasing (sweeping) the threshold, the amplitude of the received signal can be recovered. This is referred to as "swept threshold sampling" and is described in the article "Thresholded samplers for UWB impulse radar" by Hjortland et al. An example of a radar chip based on this principle is commercially available from Novelda in Norway.

A potential problem with sampling a signal in real time using a series of on-chip elements, is the absence of a temperature-stable clock reference. Although the starting point of sampling can be established e.g. with a reference echo, the exact duration of the sampling will depend on the delay components on the chip. For example, the radar module may exhibit a large temperature drift, since all delay elements in the chip possess pronounced temperature dependence. In laboratory measurements an uncompensated temperature drift in the order of 4 cm per 10° C. has been observed. This problem is particularly relevant for radar level gauging implementations.

GENERAL DISCLOSURE OF THE INVENTION

It is a general object of the present invention to overcome or mitigate the above mentioned problem of real time sampling radar modules, by providing calibration of a radar level gauge implementing such sampling.

According to a first aspect of the present invention, this object is achieved by a device for using electromagnetic pulses to determine a distance to a surface, comprising a signal propagation device for transmitting a pulsed measuring signal towards the surface and receiving a reflection signal reflected from the surface, a pulse generator for providing the pulsed measuring signal to the signal propagating device, a real time sampler for receiving an input signal and sampling the input signal to provide a sampled input signal, processing circuitry connected to receive the sampled signal from the sampler, and a calibration unit, having a signal generator for generating a calibration signal with a predefined frequency. In a calibration mode, the real time sampler receives as input signal the calibration signal from the calibration unit, and the processing circuitry is arranged to determine an average sample time delay of the sampler based on the sampled calibration signal and the known calibration frequency, and in a measurement mode, the real time sampler receives as input signal the reflection signal from the propagation device, and the processing circuitry is arranged to determine the distance based on a sampled reflection signal and the average sample time delay.

According to a second aspect of the present invention, the above object is achieved by a method for calibrating a device using electromagnetic waves for determining a distance to a surface, the device comprising a real time sampler, the method comprising a calibration cycle including generating a calibration signal with a predefined frequency, sampling the calibration signal in the real time sampler, and determining an average sample time delay of the sampler based on the sampled calibration signal and the known calibration frequency, and a measurement cycle including transmitting a pulsed measurement signal towards the surface, receiving a reflection signal reflected from the surface, sampling the reflection signal in the real time sampler, and determining the distance based on the sampled reflection signal and the average sample time delay.

By providing a calibration signal with a known frequency to the sampler, it is possible to correlate the sampled signal to the period of the calibration signal, and determine an average sample time delay. For example, it is possible to determine the number of samples within one period of the signal, and thus determine the average duration of each sample delay.

By real time sampler is here intended a sampler capable of sampling an electromagnetic pulse with a resolution sufficient to make an accurate time determination. In a typical distance measurement application, based on reflection of electromagnetic pulses, this indicates a sample time in the order of nanoseconds or less. As an example, the sample time delay (i.e. the delay of the individual sampling elements) can be less than 100 picoseconds, or less than 50 picoseconds. In one embodiment, the sample time delay is approximately 30 picoseconds.

An accurate determination of the average sample time delay of the sampler (average time delay of the individual sampling elements) makes it possible to exactly determine the distance (in time and thus space) between two points in the sampled signal, and thus provide a calibrated distance measurement.

The measurement cycle and calibration cycle may be performed consecutively or in parallel. In the latter case, the two input signals (pulse reflection and calibration signal) may be separated from each other by amplitude or frequency.

The average sample delay may be determined by determining the time of several samples and dividing by the number of samples. Another option is to determine the delay of a single sample, and assume that this delay is representative for all samples.

The present invention is specifically useful for implementation in radar level gauges, where electromagnetic signals are used to determine a filling level of a tank pr other container. In this context, temperature variations may be significant, and it is critical to provide a temperature independent measurement. Calibration according to the present invention is therefore useful.

It is noted that the invention relates to all possible combinations of features recited in the claims.

BRIEF DESCRIPTION OF THE DRAWINGS

This and other aspects of the present invention will now be described in more detail, with reference to the appended drawings showing currently preferred embodiments of the invention.

DETAILED DESCRIPTION OF CURRENTLY PREFERRED EMBODIMENTS

Figure 1A:
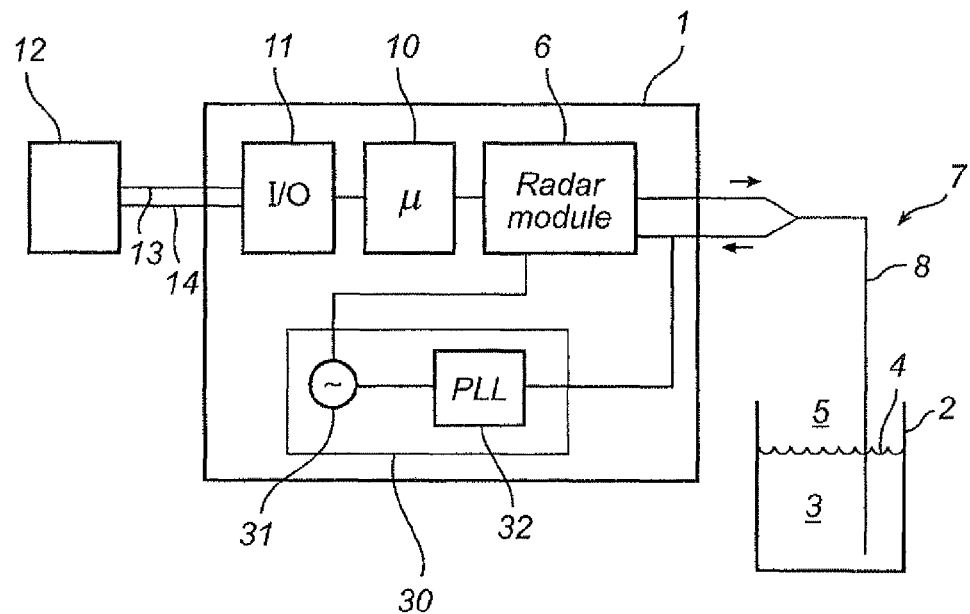
FIGS. 1a and 1b show schematic block diagrams of a radar level gauge mounted on a tank.

The present invention will herein be described with reference to a level gauging device. However, this is by no means to be considered a limitation of the present invention, which maybe advantageously implemented in any distance ranging device based on sampling on a nanosecond time scale or less, such as swept threshold sampling.

FIG. 1 shows a schematic block diagram of a radar level gauge (RLG) 1 mounted on a tank 2. The RLG 1 is arranged to perform measurements of a process variable such as the filling level of a content 3 in the tank 2, by detecting a distance to an interface 4 between media in the tank. Typically, the first medium is the content 3 stored in the tank, for example a liquid such as gasoline, while the second medium 5 is the surrounding atmosphere, e.g. air. The interface 4 is then the surface of the content. Detection of the distance to other interfaces, such as an interface between different contents (e.g. oil and water), may also be possible, depending on the transparency of the uppermost content.

The RLG 1 comprises a radar module 6, for generating an electromagnetic pulse and for receiving a reflected signal. The radar module will be described in more detail below. The radar module 6 is connected to a signal propagation device 7 arranged in the tank 2 and adapted to allow propagation of transmitted signals into the tank, and to receive a reflected signal that has been reflected by an interface 4 in the tank 2.

The propagation device 7 can be a guided wave transmission line 8 as illustrated in FIG. 1a. Such a transmission line can be a coaxial probe, a rigid or flexible twin probe, or a rigid or flexible single probe. A (twin or single) flexible probe is also referred to as a wire probe, while a (twin or single) rigid probe is also referred to as a rod probe. In particular in the case of a flexible probe, the lower end of the probe can be attached in the bottom of the tank, or attached to a weight that ensures that the end of the probe remains in the bottom of the tank.

Figure 1B:
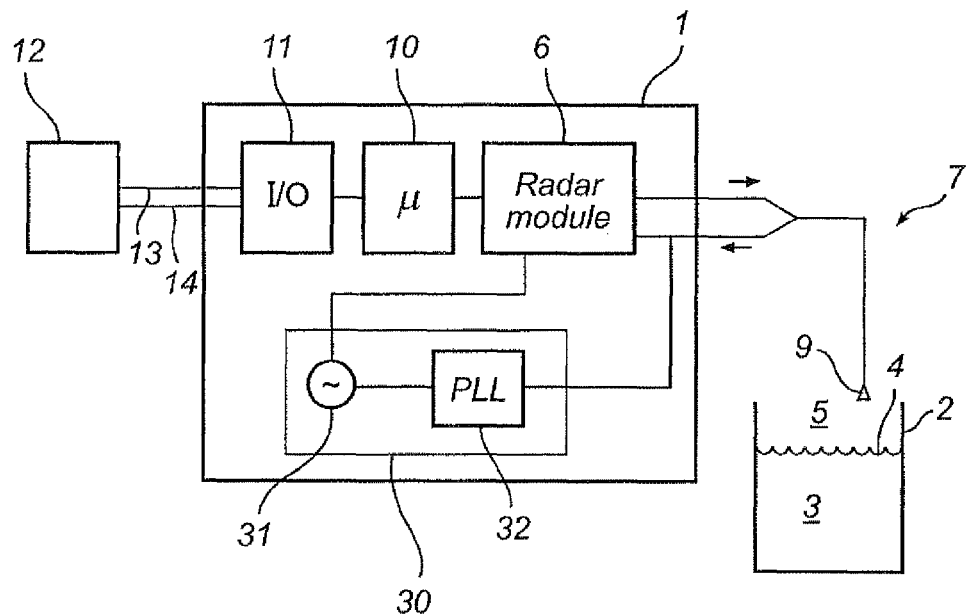

Alternatively, the propagation device 7 can be a free propagating antenna 9, arranged in the top of the tank 2, as illustrated in FIG. 1b.

Processing circuitry 10 is connected to the radar unit 6, and arranged to determine a process variable, such as a filling level of a product in the tank, based on information received from the radar module 6. The processing circuitry 10 can further be connected to a communication interface 11 which is adapted to provide communication externally of the RLG 1, and also arranged to receive power for the RLG 1.

As an example, the communication between the communication interface 11 and a control station 12 can be provided by a two-wire interface comprising two lines 13, 14, which has a combined function of both transmitting the measurement result to the control station 12 and for receiving power for operation of the RLG 1. The current in the lines is regulated in accordance with a measurement result determined by the processing circuitry 10.

An example of such a two-wire connection, at the same time supplying power and communicating a measurement signal, is a 4-20 mA industrial loop. However, a person skilled in the art realizes that other types of communication protocols might be used, such as for example a four-wire connection in which case the power supply to the RLG 1 is supplied through two of the four wires, and the communication is provided through the remaining two wires.

The RLG 1 could also communicate wirelessly with the control station 12 with e.g. a Wireless HART protocol and use a local power supply with batteries or other means of scavenging energy for autonomous operation.

Figure 2:
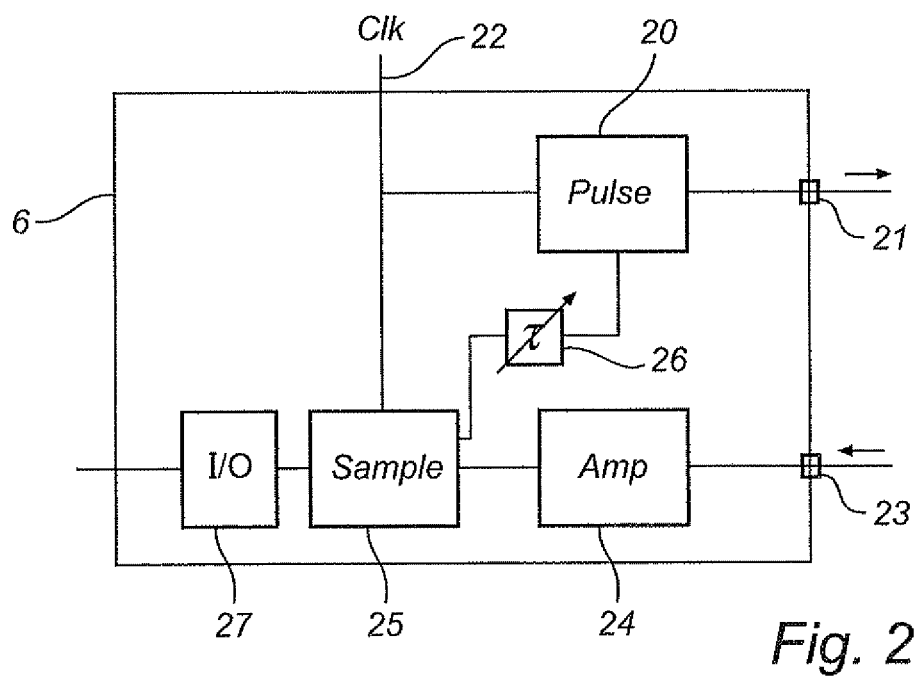
FIG. 2 shows a more detailed block diagram of the radar module in FIG. 1.

FIG. 2 shows a more detailed block diagram of the radar module 6 in FIG. 1. The radar module 6 here comprises a transmitter part and a receiver part integrated on a single chip. A single chip design may be achieved by integration on a single silicon die, or on multiple silicon dies integrated in a single, mountable component.

The transmitter part includes a pulse generator 20 arranged to generate and transmit pulses having a desired frequency and pulse shape. The pulse generator 20 is connected to the signal propagation device 7 via an output terminal 21. The repetition frequency of the pulse generator is governed by an external clock signal 22, e.g. received from the processing circuitry 10. As an example, the center frequency of the pulses can be 3.4 GHz, and the repetition frequency can be in the range 1-100 MHz, e.g. 90 MHz. The duration of each pulse is in the order of nanoseconds.

The receiver part includes an input terminal 23 connected to an amplifier 24 arranged to amplify a signal received at the input terminal 23. The receiver part further includes a real time sampler 25 arranged to sample the received signal in real time. In the context of radar level gauging, real time sampling indicates a resolution in the order of picoseconds. The sampler 25 is connected to the pulse generator 20 via a time delay unit 26, and is arranged to begin sampling of the received signal a preset delay τ after the time of emission of the gauging pulse.

The radar module 6 further comprises an I/O-interface 27, for receiving control input from the processing circuitry 10 and for returning an output signal to the processing circuitry.

According to one embodiment, the sampler 25 is arranged to operate according to the "swept threshold sampling" principle described in "Thresholded samplers for UWB impulse radar" by Hjortland et al., herewith incorporated by reference. According to this approach, the received signal is compared with a threshold, and the unclocked output is sampled by an array of inverter stages. The array may comprise e.g. 128 CMOS inverter stages, thus providing a binary sequence of 128 bits. The sampling is repeated several times, while gradually increasing (sweeping) the threshold, thereby resulting in a plurality of binary sequences. These binary sequences are combined to produce a digitally sampled signal, having a resolution that corresponds to the number of sampling repetitions plus one. For example, if only one sampling is performed, the resolution will be 2 (high or low). If 511 samplings are performed, the resolution will be 512, or $2^9$. The sampler can optionally be arranged to acquire repeated sample sequences and to average the result, in order to reduce the effect of noise.

The effective sampling-rate will be inversely proportional to the propagation delay of a single inverter stage. As an example, if the propagation delay of one inverter is about 30 ps, the sampling rate will be close to 35 GS/s. As electromagnetic waves travel at a speed of 0.3 mm/ps in vacuum, the spatial resolution of the sampler would then be around 9 mm if a one-way delay is measured or 4.5 mm if a two-way delay is measured.

The delay of each CMOS inverter stage will depend on a number of factors, including process (random and systematic deviations from a nominal design delay of the manufactured CMOS chip), supply voltage, and temperature. In the example mentioned above, the delay of one inverter stage will thus not be constant, but may vary within a given range.

Returning to FIG. 1, the RLG according to an embodiment of the present invention further comprises a calibration unit 30, for generating a calibration signal with a known frequency. The calibration unit 30 here comprises an accurate timing component 31, here in the form of a temperature compensated crystal oscillator (TCXO) 31, and a phase locked loop 32. The output of the TCXO 31 is connected to the PLL 32 and also to the clock terminal of the radar module 6, in order to provide timing to the receiver part of the radar module 6. The calibration signal from the PLL 32 is thereby referenced to the operation of the radar module 6. A typical calibration frequency is 1 GHz.

The RLG further comprises means of coupling signal (e.g. a combiner or a switch) enabling connection of the input terminal of the radar module 6 to the signal propagation device 7 and the calibration unit 30.

In measurement mode, the pulse generator 20 is active, and generates a pulse which is transmitted to the propagation device 7 and propagated into the tank 2. The signal is reflected by the interface 4, and the reflected signal is returned to the radar module 6 via the signal propagation device 7. This signal is sampled by the sampler, and the processing circuitry 10 is arranged to determine a filling level in the tank based on the sampled signal. In measurement mode, the calibration unit 30 is powered off.

In order to determine the distance to the surface 4, the processing circuitry correlates the received echo with information about when the pulse was transmitted into the tank. One option is to arrange the radar module 6 immediately adjacent to the tank opening, so that the pulse will enter the tank as soon as it is generated. Another option, conventionally used in radar level gauging, is to correlate the surface echo pulse with a known reference pulse, typically caused by a transition in the propagation device 7, where it enters the tank 2.

In calibration mode, the calibration unit 30 is active and generates a calibration signal with a predetermined frequency. In this mode, the radar module 6 receives the calibration signal. The calibration signal is sampled by the sampler 25, and the processing circuitry 10 is arranged to determine the average sample time delay by correlating the sampled signal with the known period.

The calibration can be performed separately from the measurement, but may alternatively be performed in parallel. The calibration signal can be distinguished from the tank reflection by suitable signal processing.

Figure 3:
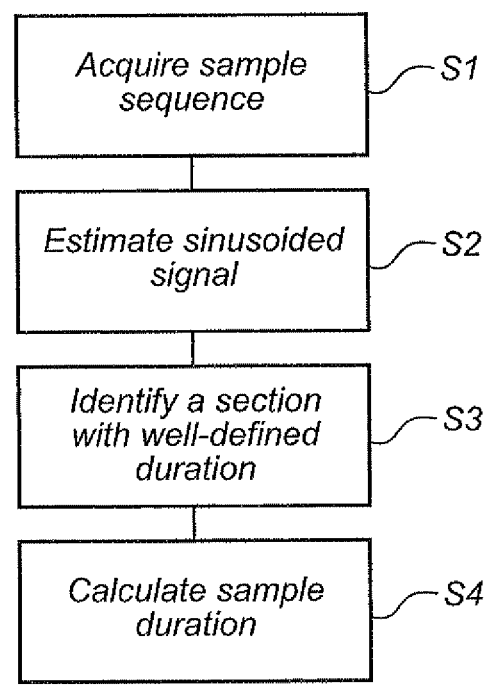
FIG. 3 is a flow chart of a method according to an embodiment of the present invention.

A simple calibration procedure is illustrated in FIG. 3.

First, in step S1, a complete sampling is acquired from the radar module, using the calibration signal from the calibration unit as input. Practical experiments have shown that it may be sufficient to use a resolution of 4 bits for the sample sequence acquired for calibration purposes. Although such a resolution does not resemble the calibration signal very well, it can be matched to a sinusoidal signal with sufficient accuracy. This matching, using e.g. interpolation, is performed in step S2, and the result is a sampled sinusoidal signal with very high resolution.

Figure 4:
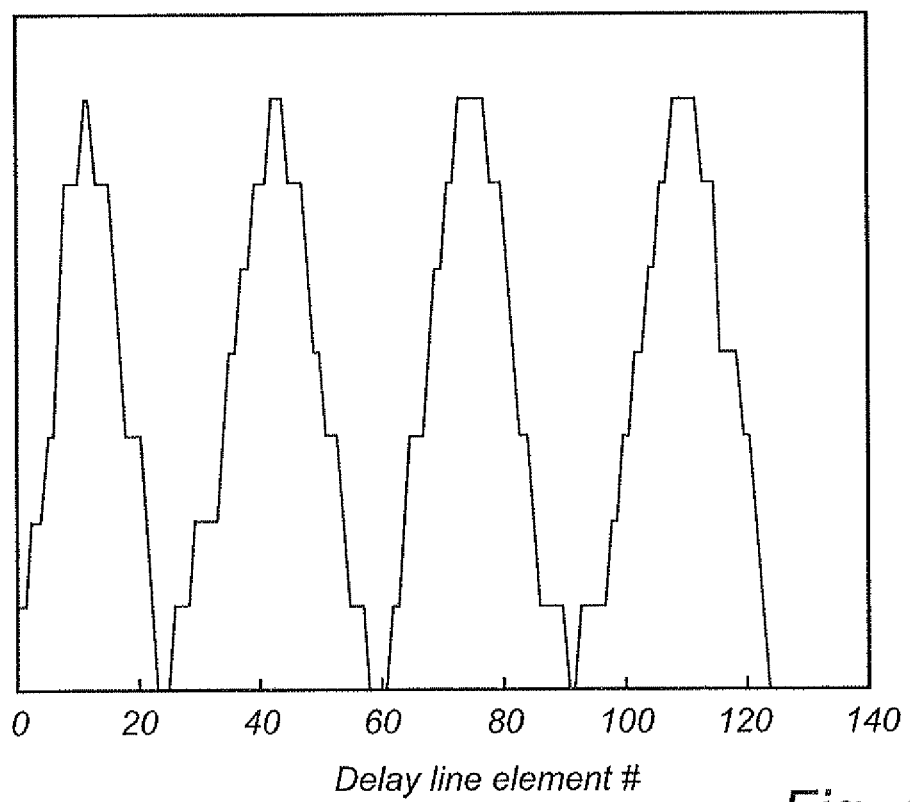
FIG. 4 is a diagram showing an example of a sampled signal.

FIG. 4 provides an example of a sampled signal, with a frequency of 1 GHz, sampled by 128 samplers.

In step S3, a number of complete periods or half-periods are identified, and the number of samples comprised in these periods or half-periods is determined. For example, signal peaks can be identified, and used to count a number of periods. Alternatively, zero crossings may be identified, and used to count half-periods. In the example in FIG. 4, the 128 samplers correspond to about 4 ns, which in turn correspond to four periods of the 1 GHz calibration signal. In the figure, four signal peaks can be identified, indicating three full periods. The first peak is found to appear at sample number 11, while the fourth peak is found to appear at sample number 108.

In step S4, the duration of a sample is determined by dividing the signal duration with the number of samples. In the illustrated example, 3 periods corresponds to 3 ns. This duration is divided by 108−11=97 samples, resulting in an average sample time delay of 30.9 ps.

Figure 5:
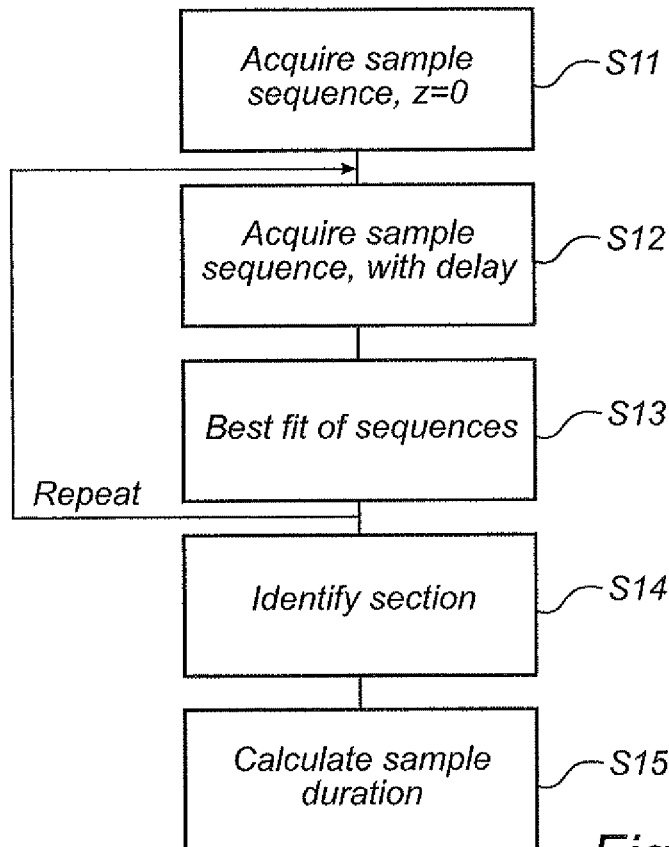
FIG. 5 is a flow chart of a procedure for fitting two sampled sequences together.

In order to improve the accuracy of the procedure, repeated sample sequences may be acquired, separated in time using the time delay module 26. With reference to the sampler described above, a possible procedure is described with reference to FIG. 5.

First, in step S11, a sample sequence is obtained with a delay of zero. This sampling contains 128 samples, and is approximately 128×30 ps long.

Then, the delay is set to be approximately 3 ns, and a new sample sequence is obtained in step S12. In step S13, this sample sequence is fitted with the first sampled signal, e.g. by performing a best fit matching of the end of the first sample sequence with the beginning of the second sample sequence.

Figure 6:
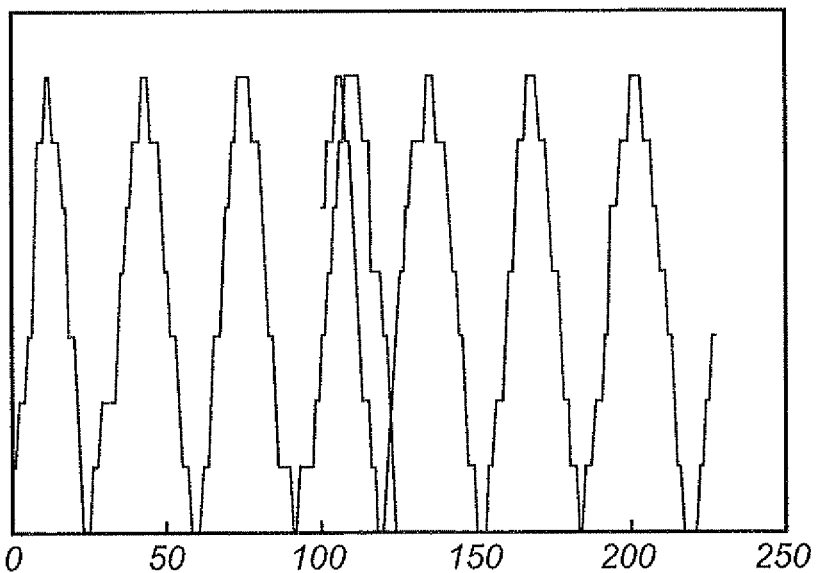
FIG. 6 is a diagram of two sample sequences that have been fitted together.

FIG. 6 shows an example where two sample sequences have been fitted together. The result is a longer sample sequence, here around 230 samples long (the delay corresponds to around 100 samples of the first sequence, after which the second sequence of 128 samples is added).

Steps S12 and S13 are repeated until an accumulated sample sequence of desired length has been obtained. Then, in steps S14 and S15, similar processing as was discussed with reference to steps S3 and S4 are performed. The result is again an average sample time delay, here determined with increased accuracy and reduced uncertainty.

The calibration unit 30, and in particular the accurate timing component, such as a TCXO 31, may have relatively large power consumption. In situations with limited available power, such as in a wireless level gauge, it may therefore be advantageous to only activate the calibration unit regularly on the time scale of typical temperature variations. Further, it may be advantageous to limit the use of the accurate timing component 31 to the calibration mode. At each calibration, the resulting average sample time delay can be stored in memory, in order to allow correction of future measurements. In between calibrations, the radar module 6 can be controlled by the less power consuming low accuracy clock of the processing circuitry 10, as all timing elements are provided by on-chip logic, with correction factors stored from the latest calibration procedure.

It should be noted that it would be theoretically possible to determine the exact propagation delay of each sampling element (each inverter stage) individually. However, for most applications, an average calibration is sufficient.

It is further noted that the skilled person will realize that the several modification of the above described embodiment without departing from the inventive concept defined by the claims. For example, the circuit design may include a variety of different components, in addition or instead of the ones illustrated here.

What is claimed is:

1. A device for using electromagnetic pulses to determine a distance to a surface, comprising:
    a signal propagation device, for transmitting a pulsed measuring signal towards the surface, and receiving a reflection signal reflected from the surface,
    a pulse generator for providing the pulsed measuring signal to the signal propagating device,
    a real time sampler for receiving an input signal and sampling said input signal to provide a sampled input signal,
    processing circuitry, connected to receive the sampled signal from the sampler, and
    a calibration unit, having a signal generator for generating a calibration signal with a predefined frequency,
    wherein, in a calibration mode, the real time sampler receives as input signal the calibration signal from the calibration unit, and the processing circuitry is arranged to determine an average sample time delay of the sampler based on the sampled calibration signal and the known calibration frequency, and
    wherein, in a measurement mode, the real time sampler receives as input signal the reflection signal from the propagation device, and the processing circuitry is arranged to determine said distance based on a sampled reflection signal and the average sample time delay.

2. The device according to claim 1, wherein the average sample time delay of the sampler is less than 100 picoseconds.

3. The device according to claim 2, wherein the average sample time delay of the sampler is less than 50 picoseconds.

4. The device according to claim 1, wherein the real time sampler is arranged to receive the reflection signal and the calibration signal in parallel.

5. The device according to claim 1, wherein said processing circuitry is arranged to identify a defined sequence of the sampled calibration signal and the number of samples taken during said sequence, and to divide the sequence with the number of samples to obtain the average sample time delay.

6. The device according to claim 1, wherein said processing circuitry is arranged to acquire a plurality of sample sequences, time delayed in relation to each other, and to time align said sample sequences with each other to form an extended sample sequence to base the determination of said average sample time delay on.

7. The device according to claim 1, wherein said processing circuitry is arranged to determine the average sample time delay by determining a time delay of a single sample, and estimating the average sample time delay as said time delay of a single sample.

8. The device according to claim 1, wherein the pulse generator and sampler are formed on a single integrated circuit component.

9. A pulsed radar level gauge using electromagnetic waves for determining a filling level of a tank, comprising:
    a signal propagation device, for transmitting a pulsed measuring signal into the tank, and receiving a reflection signal from the tank,
    a radar module having a pulse generator for providing the pulsed gauging signal to the signal propagating device, and a real time sampler for receiving an input signal and sampling said input signal to provide a sampled input signal,
    processing circuitry, connected to receive the sampled signal from the radar module, and
    a calibration unit, having a signal generator for generating a calibration signal with a predefined frequency,
    wherein, in a measurement mode, the real time sampler receives as input signal the reflection signal from the propagation device, and the processing circuitry is arranged to determine said filling level based on a sampled reflection signal, and,
    wherein, in a calibration mode, the real time sampler receives as input signal the calibration signal from the calibration unit, and the processing circuitry is arranged to determine an average sample time delay based on the sampled calibration signal and the known calibration frequency.

10. The radar level gauge according to claim 9, further comprising a wireless communication, interface and an internal power supply.

11. A method for calibrating a device using electromagnetic waves for determining a distance to a surface, said device comprising a real time sampler, said method comprising:
    a calibration cycle including:
        generating a calibration signal with a predefined frequency,
        sampling the calibration signal in said real time sampler, and
        determining an average sample time delay of the sampler based on the sampled calibration signal and the known calibration frequency, and
    a measurement cycle including:
        transmitting a pulsed measurement signal towards the surface,
        receiving a reflection signal reflected from the surface,
        sampling the reflection signal in said real time sampler, and
        determining said distance based on the sampled reflection signal and the average sample time delay.

12. The device according to claim 11, wherein the average sample time delay of the sampler is less than 100 picoseconds.

13. The device according to claim 11, wherein the average sample time delay of the sampler is less than 50 picoseconds.

14. The method according to claim 11, wherein the measurement cycle and the calibration cycle are performed in parallel.

15. The method according to claim 11, wherein the calibration cycle further comprises identifying a defined portion of the sampled calibration signal, and the number of samples taken during said portion, and to divide the portion with the number of samples to obtain the average sample time delay.

16. The method according to claim 11, wherein the calibration cycle further comprises acquiring a plurality of sample sequences, time delayed in relation to each other, matching said plurality of sample sequences with each other to form an extended sample sequence, and basing the determination of said average sample time delay on said extended sample sequence.

17. A method for calibrating a radar level gauge using electromagnetic waves to determine a filling level of a tank, said radar level gauge comprising a real time sampler for sampling an input signal, said method comprising a calibration cycle including:
   generating a calibration signal with a predefined frequency,
   sampling the calibration signal in said real time sampler, and
   determining an average sample time delay of the sampler based on the sampled calibration signal and the known calibration frequency, and
a measurement cycle including:
   transmitting a pulsed measurement signal into the tank,
   receiving a reflection signal reflected from the tank,
   sampling the reflection signal in said real time sampler, and
   determining said filling level based on the sampled reflection signal and the average sample time delay.

\* \* \* \* \*